(12) United States Patent
Matsumoto (10) Patent No.: US 12,463,719 B2
(45) Date of Patent: Nov. 4, 2025

(54) COMMUNICATION SYSTEM, METHOD, AND NON-TRANSITORY COMPUTER READABLE MEDIUM

(71) Applicant: NEC Corporation, Tokyo (JP)

(72) Inventor: Kazuki Matsumoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 260 days.

(21) Appl. No.: 18/240,126

(22) Filed: Aug. 30, 2023

(65) Prior Publication Data

US 2024/0080094 A1 Mar. 7, 2024

(30) Foreign Application Priority Data

Sep. 5, 2022 (JP) .................................. 2022-140472

(51) Int. Cl.
*H04B 10/00* (2013.01)
*H04B 10/03* (2013.01)
*H04J 14/00* (2006.01)

(52) U.S. Cl.
CPC .................................... *H04B 10/03* (2013.01)

(58) Field of Classification Search
CPC .... H04B 10/03; H04B 10/032; H04B 10/035; H04B 10/038
See application file for complete search history.

(56) References Cited

U.S. PATENT DOCUMENTS

| 2019/0007131 A1* | 1/2019 | Satyarthi ................ G11C 16/12 |
| 2019/0109638 A1* | 4/2019 | Yilmaz ............. H04B 10/0791 |
| 2022/0385357 A1* | 12/2022 | Chander ............. H04J 14/0268 |

FOREIGN PATENT DOCUMENTS

JP  2003-258730 A  9/2003

* cited by examiner

*Primary Examiner* — Daniel G Dobson
(74) *Attorney, Agent, or Firm* — Sughrue Mion, PLLC (57) ABSTRACT

A communication system includes a first communication apparatus and at least one second communication apparatus connected in series through an optical communication cable. Each of second communication apparatuses calculate an index value indicating the quality of a transmission signal received from a communication apparatus disposed adjacent to and upstream of the apparatus itself. When the second communication apparatus receives restoration information indicating that the communication apparatuses disposed upstream of the apparatus itself has been restored from a failure of an input signal, it determines whether or not the calculated index value is within a predetermined range. When it is determined that the index value is not within the predetermined range, a respective optical module provided in the second communication apparatus executes a reset process, wherein the respective optical module is configured to receive a transmission signal.

13 Claims, 8 Drawing Sheets

COMMUNICATION SYSTEM, METHOD, AND NON-TRANSITORY COMPUTER READABLE MEDIUM

INCORPORATION BY REFERENCE

This application is based upon and claims the benefit of priority from Japanese patent application No. 2022-140472, filed on Sep. 5, 2022, the disclosure of which is incorporated herein in its entirety by reference.

TECHNICAL FIELD

The present disclosure relates to a communication system in which a plurality of communication apparatuses are connected in series, and also relates to a method and a non-transitory computer readable medium therefor.

BACKGROUND ART

Various technologies for restoring, when a failure occurs in a communication system in which a plurality of communication apparatuses are connected in series, the communication system from the failure have been proposed in the past.

As an example of such technologies, an optical multiplexing/demultiplexing apparatus disclosed in Japanese Unexamined Patent Application Publication No. 2003-258730 monitors optical signals from each of an active line and a standby line, detects (i.e., determines) whether or not a failure has occurred, and determines, based on the result of the detection as to the presence/absence of a failure, one of the active and standby lines as a usable effective line. Then, the optical multiplexing/demultiplexing apparatus demultiplexer an optical signal having a specific wavelength from an optical signal obtained from the effective line and supplies the obtained optical signal to a client. Then, the optical multiplexing/demultiplexing apparatus outputs the optical signal having the specific wavelength output from the client to a line for which it is determined that no failure has occurred.

SUMMARY

However, in the technology disclosed in the above-described document, since the optical signal having the specific wavelength, which is the transmission signal, is output to the line in which no failure has occurred, this technology cannot be applied to a communication system in which a plurality of communication apparatuses are connected in series in order to prevent an adverse effect that is caused by a failure of a transmission signal that is input to one of the plurality of communication apparatuses.

In view of the above-described problem, an object of the present disclosure is to provide a communication system, a method, and a non-transitory computer readable medium capable of preventing, in a communication system in which a plurality of communication apparatuses are connected in series, an adverse effect that is caused by a failure of a transmission signal that is input to one of the plurality of communication apparatuses.

In an example aspect, a communication system in which a plurality of communication apparatuses are connected in series through optical communication cables includes:
  a first communication apparatus; and
  at least one second communication apparatus disposed downstream of the first communication apparatus,
  in which the first communication apparatus includes:
    a first optical module configured to process a transmission signal received from a first upstream-side communication apparatus, the first upstream-side communication apparatus being another communication apparatus disposed adjacent to and upstream of the first communication apparatus; and
    a first processor,
    in which the first processor is configured to:
    detect a failure of an input signal to the first communication apparatus;
    make, when the failure of the input signal is detected, the first optical module execute a reset process for receiving a new input signal; and
    transmit, when the first communication apparatus has been restored from the failure of the input signal by an execution of the reset process by the first optical module, restoration information indicating that the first communication apparatus has been restored from the failure to the second communication apparatus,
  in which the second communication apparatus includes:
    a second optical module configured to process a transmission signal received from a second upstream-side communication apparatus, the second upstream-side communication apparatus being another communication apparatus disposed adjacent to and upstream of the second communication apparatus; and
    a second processor, and
    in which the second processor is configured to:
    calculate an index value indicating quality of a transmission signal received from the second upstream-side communication apparatus;
    determine, when restoration information is received, whether or not the calculated index value is within a predetermined range; and
    make, when it is determined that the index value is not within a predetermined range, the second optical module execute a reset process for receiving a new transmission signal.

In another example aspect, a method performed by a processor provided in a communication apparatus connected to another communication apparatus in series through an optical communication cable, includes:
  calculating an index value indicating quality of a transmission signal received from an upstream-side communication apparatus, the upstream-side communication apparatus being another communication apparatus disposed adjacent to and upstream of the communication apparatus including the processor;
  determining, when restoration information indicating that the upstream-side communication apparatus has been restored from a failure of an input signal, whether or not the calculated index value is within a predetermined range; and
  making, when it is determined that the calculated index value is not within the predetermined range, an optical module execute a reset process for receiving a new transmission signal, the optical module being provided in the communication apparatus including the processor and configured to process a transmission signal.

In another example aspect, the present disclosure provides a non-transitory computer readable medium storing a program adapted to be executed by a processor provided in a communication apparatus connected to another communication apparatus through an optical communication cable, the program being configured to cause the processor to perform:

a step of calculating an index value indicating quality of a transmission signal received from an upstream-side communication apparatus, the upstream-side communication apparatus being another communication apparatus disposed adjacent to and upstream of the communication apparatus including the processor;

a step of determining, when restoration information indicating that the upstream-side communication apparatus has been restored from a failure of an input signal, whether or not the calculated index value is within a predetermined range; and a step of making, when it is determined that the calculated index value is not within the predetermined range, an optical module execute a reset process for receiving a new transmission signal, the optical module being provided in the communication apparatus including the processor and configured to process a transmission signal.

The above and other objects, features and advantages of the present disclosure will become more fully understood from the detailed description given hereinbelow and the accompanying drawings which are given by way of illustration only, and thus are not to be considered as limiting the present disclosure.

EXAMPLE EMBODIMENT

Figure 1:
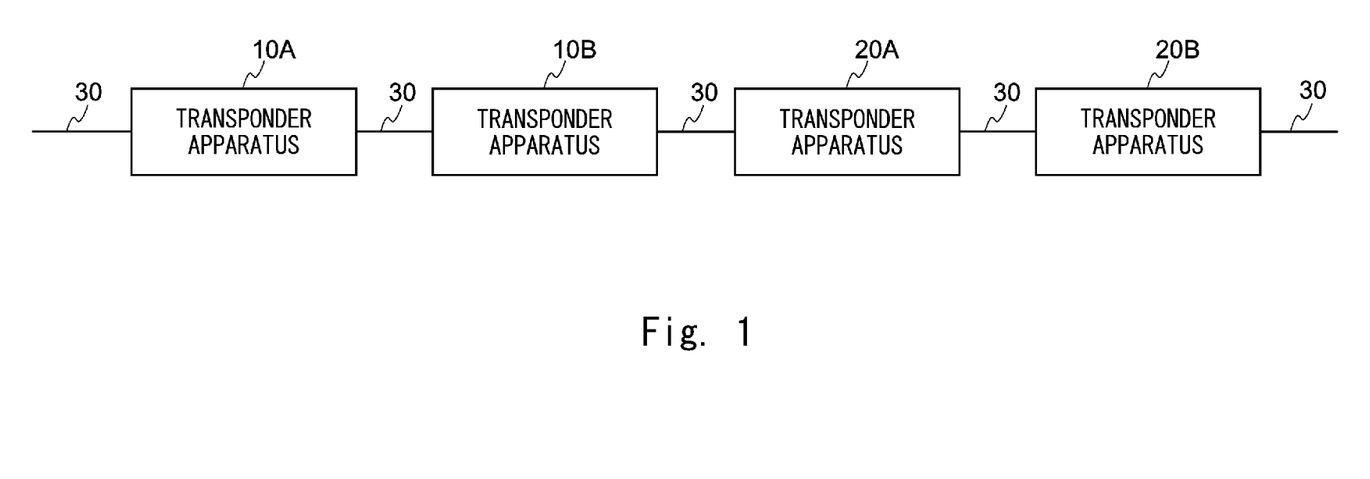
FIG. 1 shows an example of a communication system according to an example embodiment.

An example embodiment will be described hereinafter with reference to the drawings. FIG. 1 shows an example of a communication system 1 according to an example embodiment. The communication system 1 includes a plurality of communication apparatuses connected in series through optical communication cables 30. Specific examples of communication apparatuses include transponder apparatuses and the like. In this example embodiment, transponder apparatuses are adopted as communication apparatuses.

In the example shown in FIG. 1, the communication system 1 includes a transponder apparatus 10A, a transponder apparatus 10B, a transponder apparatus 20A, and a transponder apparatus 20B. The transponder apparatuses 10A, 10B, 20A and 20B correspond to communication apparatuses. The transponder apparatuses 10A and 10B are paired. Similarly, the transponder apparatuses 20A and 20B are paired. Note that although the communication system 1 includes two pairs of transponder apparatus in the example shown in FIG. 1, the communication system 1 may include three or more pairs of transponder apparatuses.

Each of the transponder apparatuses 10A and 20A detects whether or not a failure of an input signal to the apparatus itself has occurred. When the transponder apparatus 10A or 20A detects a failure of an input signal, it initializes an optical module provided in the apparatus itself and thereby restores the apparatus itself from the failure. Then, when the transponder apparatus 10A or 20A has been restored from the failure, it transmits restoration information indicating that the transponder apparatus 10A or 20A has been restored from the failure to a transponder apparatus disposed adjacent to and downstream of the transponder apparatus 10A or 20A. Further, when the transponder apparatus 10A or 20A receives restoration information of the other transponder apparatus disposed upstream of the apparatus itself, it transmits the received restoration information to the transponder apparatus 20A or 20B disposed adjacent to and downstream of the transponder apparatus 10A or 20A.

When the transponder apparatus 10B or 20B receives restoration information from the other transponder apparatus disposed upstream of the apparatus itself, the transponder apparatus 10B or 20B determines quality of a transmission signal received from a transponder apparatus disposed adjacent to and upstream of the apparatus itself. Then, when the quality of the transmission signal does not meet (i.e., is lower than) certain quality, the transponder apparatus 10B or 20B receives a new transmission signal from the transponder apparatus disposed adjacent to and upstream of the apparatus itself.

Figure 2:
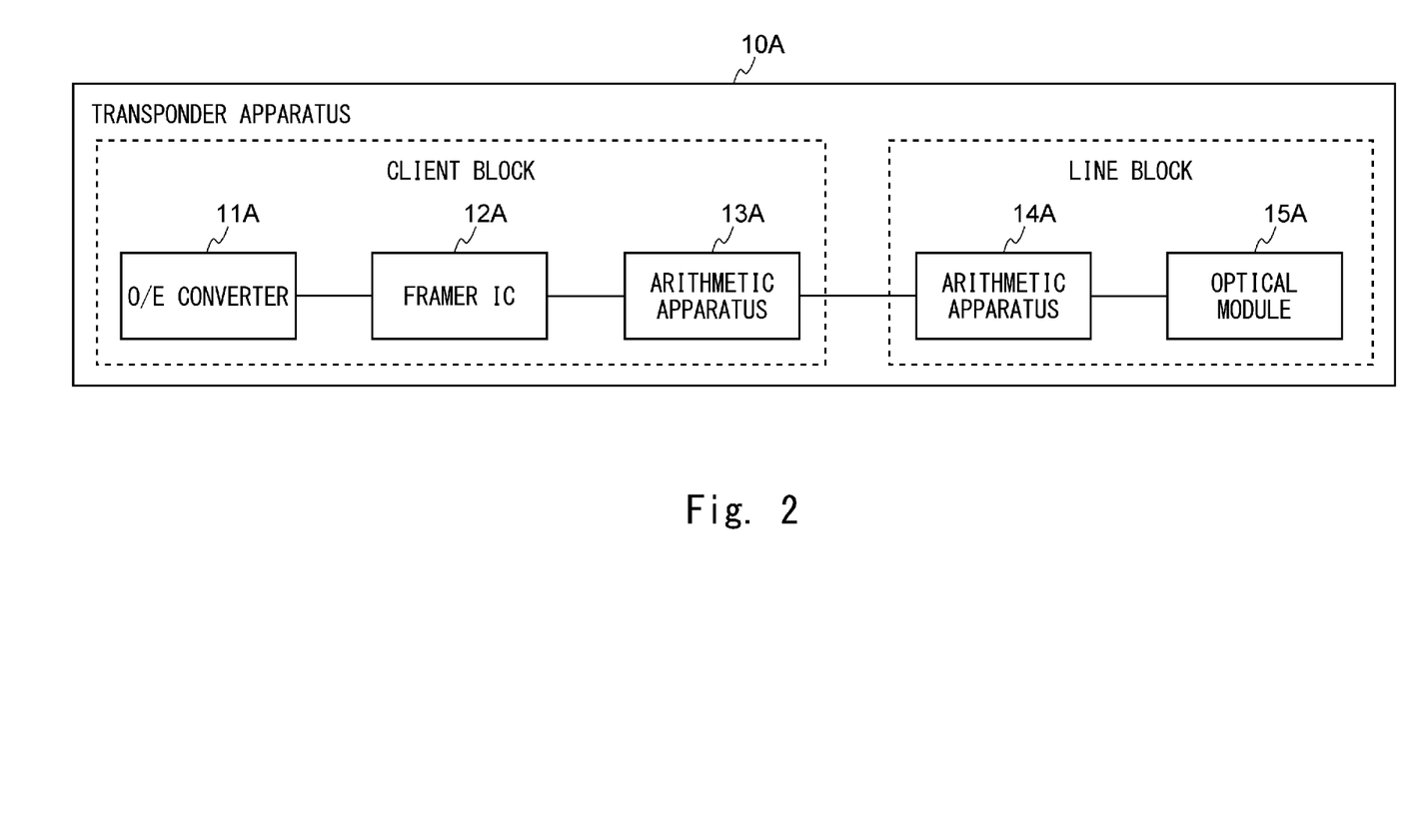
FIG. 2 shows a hardware configuration of a first transponder apparatus according to an example embodiment.

FIG. 2 shows a hardware configuration of the transponder apparatus 10A according to an example embodiment. The transponder apparatus 20A has a configuration identical to that of the transponder apparatus 10A.

The transponder apparatus 10A includes an O/E (Optical/Electrical) converter 11A, a framer IC (Integrated Circuit) 12A, and an arithmetic apparatus 13A, all of which are included in a client block, and also includes an arithmetic apparatus 14A and an optical module 15A, both of which are included in a line block. The client block of the transponder apparatus 10A is a functional block for performing mapping of a client-side interface which is a connection point with a communication apparatus used by a user of the communication system 1. The line block of the transponder apparatus 10A is a functional block for modulating a transmission signal and transmitting the modulated transmission signal to the transponder apparatus 10B disposed adjacent to and downstream of the transponder apparatus 10A.

The O/E converter 11A converts an optical signal into an electric signal. The framer IC 12A performs a mapping process, an OH (Over Head) process, a forward error correction (FEC: Forward Error Correction) process, and the like for an input signal to the transponder apparatus 10A.

The arithmetic apparatus 13A detects a failure of an input signal to the transponder apparatus 10A, and when a failure has occurred in an input signal, notifies the arithmetic apparatus 14A of the occurrence of the failure. Specific examples of the arithmetic apparatus 13A includes a field-programmable gate array (FPGA: Field-Programmable Gate Array). Alternatively, any of various processors such as a CPU (Central Processing Unit) and a Micro Processing Unit (MPU) and integrated circuits such as an ASIC (Application Specific Integrated Circuit) may be used as the arithmetic apparatus 13A.

When the arithmetic apparatus 14A receives a notification indicating that a failure of an input signal has occurred from the arithmetic apparatus 13A, it makes the optical module 15A perform a reset process, or an initializing process, for receiving a new transmission signal. Further, after the reset process by the optical module 15A is completed, the arithmetic apparatus 14A transmits restoration information indicating that the transponder apparatus 10A has been restored from the failure of the input signal to the transponder apparatus 10B disposed adjacent to and downstream of the transponder apparatus 10A through the optical module 15A. Specific examples of the arithmetic apparatus 14A includes an FPGA. Alternatively, any of various processors such as a CPU and an MPU and integrated circuits such as an ASIC may be used as the arithmetic apparatus 14A.

The optical module 15A processes a transmission signal received from a communication apparatus disposed upstream of the transponder apparatus 10A. Specifically, the optical module 15A modulates the received transmission signal and transmits the modulated transmission signal to the transponder apparatus 10B. Further, the optical module 15A executes a reset process based on an instruction from the arithmetic apparatus 14A, and thereby receives a new transmission signal. Note that the optical module 15A can also perform other processes such as OH process.

Figure 3:
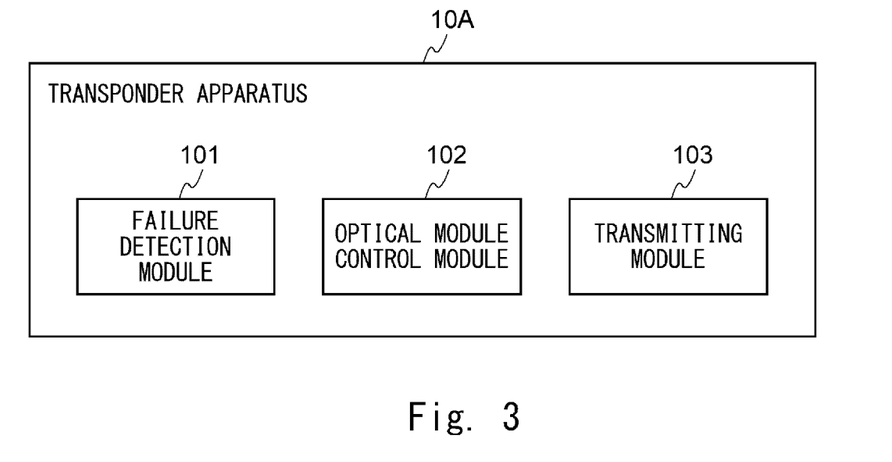
FIG. 3 is a block diagram showing functions of a first transponder apparatus according to an example embodiment.

FIG. 3 is a block diagram showing functions of the transponder apparatus 10A according to an example embodiment. The transponder apparatus 10A has a failure detection module 101, an optical module control module 102, and a transmitting module 103. In this example embodiment, the failure detection module 101 can be implemented by the arithmetic apparatus 13A. The optical module control module 102 and the transmitting module 103 can be implemented by the arithmetic apparatus 14A. Note that in other example embodiments, one arithmetic apparatus may implement all of the failure detection module 101, the optical module control module 102, and the transmitting module 103.

The failure detection module 101 is means for detecting a failure of an input signal to the transponder apparatus 10A. Specifically, the failure detection module 101 monitors the power level of an optical input to the transponder apparatus 10A and can detect a decrease in the power level of the optical input as a failure of the input signal. Further, the failure detection module 101 performs synchronous detection for determining whether or not a plurality of frames of input signals to the transponder apparatus 10A are synchronized, and when these frames of input signals are not synchronized, can detect this phenomenon as a failure of the input signals.

The optical module control module 102 is means for controlling the optical module 15A. When the failure detection module 101 has detected a failure of an input signal, the optical module control module 102 makes the optical module 15A perform a reset process for receiving a new input signal. The reset process may include a process for discarding a transmission signal already received by the optical module 15A. By the reset process, a transmission signal related to a failure, e.g., a transmission signal that has not been synchronously received or a transmission signal of which the input level has been low, is discarded in the optical module 15A.

The transmitting module 103 is means for, when the transponder apparatus 10A has been restored from the failure of the input signal by an execution of the reset process by the optical module 15A, transmitting restoration information indicating that the transponder apparatus 10A has been restored from the failure of the input signal to the transponder apparatus 10B disposed adjacent to and downstream of the transponder apparatus 10A.

Figure 4:
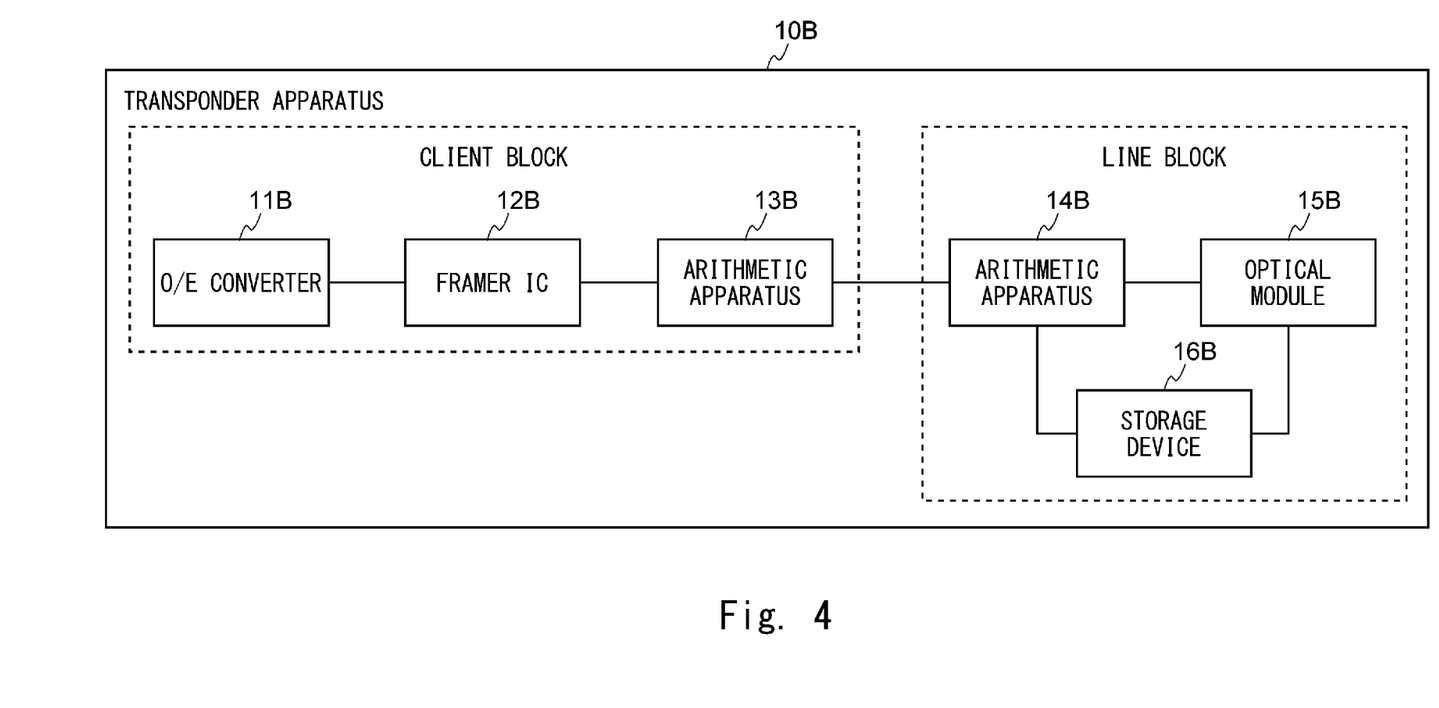
FIG. 4 shows a hardware configuration of a second transponder apparatus according to an example embodiment.

FIG. 4 shows a hardware configuration of the transponder apparatus 10B according to an example embodiment. The transponder apparatus 20B has a configuration identical to that of the transponder apparatus 10B.

The transponder apparatus 10B includes an E/O converter 11B, a framer IC 12B, and an arithmetic apparatus 13B, all of which are included in a client block, and also includes an arithmetic apparatus 14B, an optical module 15B, and a storage device 16B, all of which are included in a line block. The client block of the transponder apparatus 10B is a functional block for performing de-mapping of a client-side interface.

The optical module 15B is an apparatus that processes a transmission signal received from the transponder apparatus 10A disposed adjacent to and upstream of the transponder apparatus 10B. Specifically, the optical module 15B executes a reset process based on an instruction from the arithmetic apparatus 14B and thereby receives a new transmission signal from the transponder apparatus 10A. Further, the optical module 15B receives a transmission signal transmitted from the transponder apparatus 10A and also performs processes such as an OH process and an FEC process for the received transmission signal.

The storage device 16B is a storage device in which data that is processed by the arithmetic apparatus 14B is stored. In the storage device 16B, for example, information for making a decision on an index value indicating the quality of a transmission signal that the transponder apparatus 10B has received from the transponder apparatus 10A disposed adjacent to and upstream of the transponder apparatus 10B, information used for the decision on the index value, and the like are stored.

The arithmetic apparatus 14B is an apparatus that executes a program 110 according to the present disclosure. When the arithmetic apparatus 14B has received a notification indicating that a failure of an input signal has occurred from the transponder apparatus 10A, it makes the optical module 15B perform a reset process. Then, when the reset process by the optical module 15B has been completed, the arithmetic apparatus 14B transmits restoration information indicating that the transponder apparatus 10A has been restored from the failure of the input signal to the transponder apparatus 20A disposed adjacent to and downstream of the transponder apparatus 10B through the apparatuses included in the client block. Note that the arithmetic apparatus 14B can also perform processes such as OH process for the transmission signal received from the transponder apparatus 10A. Specific examples of the arithmetic apparatus 14B include an FPGA. Alternatively, any of various processors such as a CPU and an MPU and integrated circuits such as an ASIC may be used as the arithmetic apparatus 14B. The arithmetic apparatus corresponds to a computer.

Figure 5:
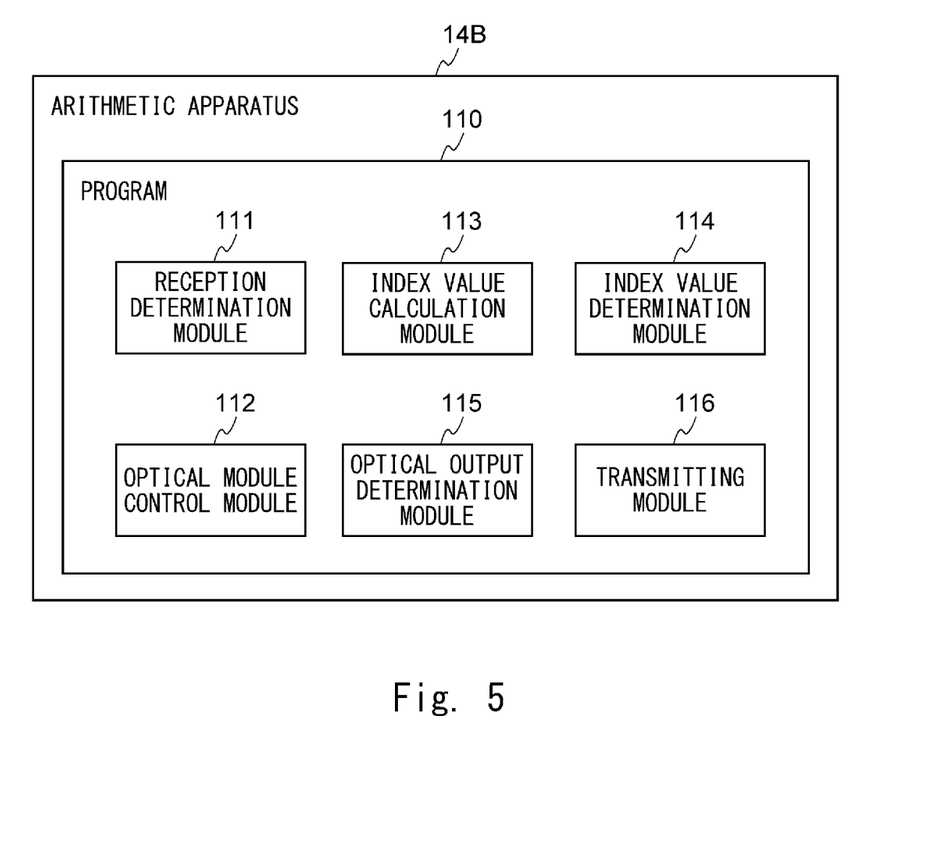
FIG. 5 shows an example of a program executed by an arithmetic apparatus according to an example embodiment.

FIG. 5 shows an example of the program 110 that is executed by the arithmetic apparatus 14B according to an example embodiment. The program 110 includes a reception determination module 111, an optical module control module 112, an index-value calculation module 113, an index-value determination module 114, an optical output determination module 115, and a transmitting module 116.

The reception determination module 111 is a program (e.g., a sub-program) for determining whether or not the transponder apparatus 10B has received restoration information indicating that the other transponder apparatus disposed upstream of the transponder apparatus 10B has been restored from the failure.

The optical module control module 112 is a program for controlling the optical module 15B. In a certain case, the optical module control module 112 makes the optical module 15B perform a reset process for receiving a new transmission signal from the transponder apparatus 10A disposed adjacent to and upstream of the own apparatus. The reset process may include a process for discarding a transmission signal already received by the optical module 15B. By the reset process, a transmission signal related to a failure, e.g., a transmission signal that has not been synchronously received or a transmission signal of which the input level has been low, is discarded in the optical module 15B.

The index-value calculation module 113 is a program for calculating an index value indicating the quality of a transmission signal received from the transponder apparatus 10A disposed adjacent to and upstream of the transponder apparatus 10B. In this example embodiment, the index-value calculation module 113 can calculate, as the index value, a Quality factor[dB] from the bit error rate (BER: Bit Error Rate) of transmission signals received from the transponder apparatus 10A. When the bit error rate of transmission signals is low, i.e., when the quality of transmission signals is high, the Quality factor increases. On the other hand, when the bit error rate of transmission signals is high, i.e., when the quality of transmission signals is low, the Quality factor decreases.

The index-value determination module 114 is a program for determining whether or not an index value calculated by the index-value calculation module 113 is within a predetermined range. In this example embodiment, the index-value determination module 114 determines whether or not a Quality factor indicating the quality of a transmission signal received from the transponder apparatus 10A is within a predetermined range. A threshold for defining the predetermined range can be set based on the Quality factor of a transmission signal that is transmitted when the quality is not deteriorated. For example, when the Quality factor of a transmission signal when the quality is not deteriorated is X (dB), the upper limit of the predetermined range can be set to +X (dB) and the lower limit thereof can be set to −X (dB). Note that X is an arbitrary numerical value. The value X can be determined according to the environmental conditions, i.e., the conditions of an environment in which the optical communication cable 30 is disposed (e.g., laid out). In other words, for each of optical communication cables 30 connected to a transponder apparatus that makes a decision on the Quality factor of a transmission signal, the predetermined range is individually determined according to the environmental conditions of that optical communication cable 30. The communication system 1 can be used to realize optical communication over a very long distance, and can be disposed on land or on the seabed.

When the optical communication cable 30 is disposed on the seabed, its environmental conditions include a variety of conditions such as the topography of the seabed on which the optical communication cable 30 is disposed (e.g., laid out), the depth of water thereof, the speed of the current, variations in the current, the water pressure, and the temperature of the seawater. When the optical communication cable 30 is disposed on land, its environmental conditions include a variety of conditions such as the topography of the place in which the optical communication cable 30 is disposed, the wind speed, the precipitation, and the temperature. The predetermined range of index values corresponding to corresponding environmental conditions may be determined based on actual variations in the index value of the optical communication cable 30 which is connected to the transponder apparatus that makes a decision on the index value and actually disposed on the seabed or on land. More specifically, the predetermined range may be a range of which the upper and lower limits are set to the maximum and minimum index values of a transmission signal that is received through the optical communication cable 30 actually disposed in the installation environment, such as on the seabed or on land, when no failure has occurred in the transmission signal. The arithmetic apparatus 14B can update the range of index values used by the index-value determination module 114 based on information indicating a new range of index values received from an external apparatus. In this case, a transponder apparatus(es) in operation can collect information that is used for the updating as a log.

In this example embodiment, a predetermined range having an upper limit is set in order to make a decision on a Quality factor that indicates the quality of a transmission signal. The predetermined range can be theoretically determined according to the scale of the transmission system, the transmission rate, the modulation method, and the like. However, in practice, a Quality factor that exceeds the theoretically-determined upper limit could be detected. In this example embodiment, the upper limit is used to make a decision on a Quality factor in order to detect such a Quality factor exceeding the theoretical upper limit as an abnormal value. In this way, it is possible to detect an abnormal value that exceeds the theoretical upper limit.

The optical output determination module 115 is a program for determining the state of an optical output of the client block. Regarding the optical output of the client block, there are two states, i.e., a state in which an optical output is made from the transponder apparatus 10B to the transponder apparatus downstream of the transponder apparatus 10B (ON) and a state in which an optical output is not made from the transponder apparatus 10B to the transponder apparatus downstream of the transponder apparatus 10B (OFF). Therefore, the optical output determination module 115 determines whether or not the optical output made is from the transponder apparatus 10B to the transponder apparatus downstream of the transponder apparatus 10B.

The transmitting module 116 is a program for, when the transponder apparatus 10B receives restoration information, transmitting the received restoration information to the transponder apparatus 20A disposed adjacent to and downstream of the transponder apparatus 10B.

When the arithmetic apparatus 13B receives restoration information from the arithmetic apparatus 14B, it makes the framer IC 12B transmit the received restoration information to the transponder apparatus 20A. Further, the arithmetic apparatus 13B performs processes such as an OH process for an input signal to the transponder apparatus 10B. Specific examples of the arithmetic apparatus 13B include an FPGA. Further, any of various processors such as a CPU and an MPU and integrated circuits such as an ASIC may be used as the arithmetic apparatus 13B.

The framer IC 12B transmits, based on an instruction from the arithmetic apparatus 13B, the restoration information received from arithmetic apparatus 13B to the transponder apparatus 20A through the E/O converter 11B. Further, the framer IC 12B performs a de-mapping process and an OH process for the input signal.

The E/O converter 11B converts an input electric signal into an optical signal. When the E/O converter 11B receives restoration information from the framer IC 12B, it transmits the received restoration information to the transponder apparatus 20A.

Figure 6:
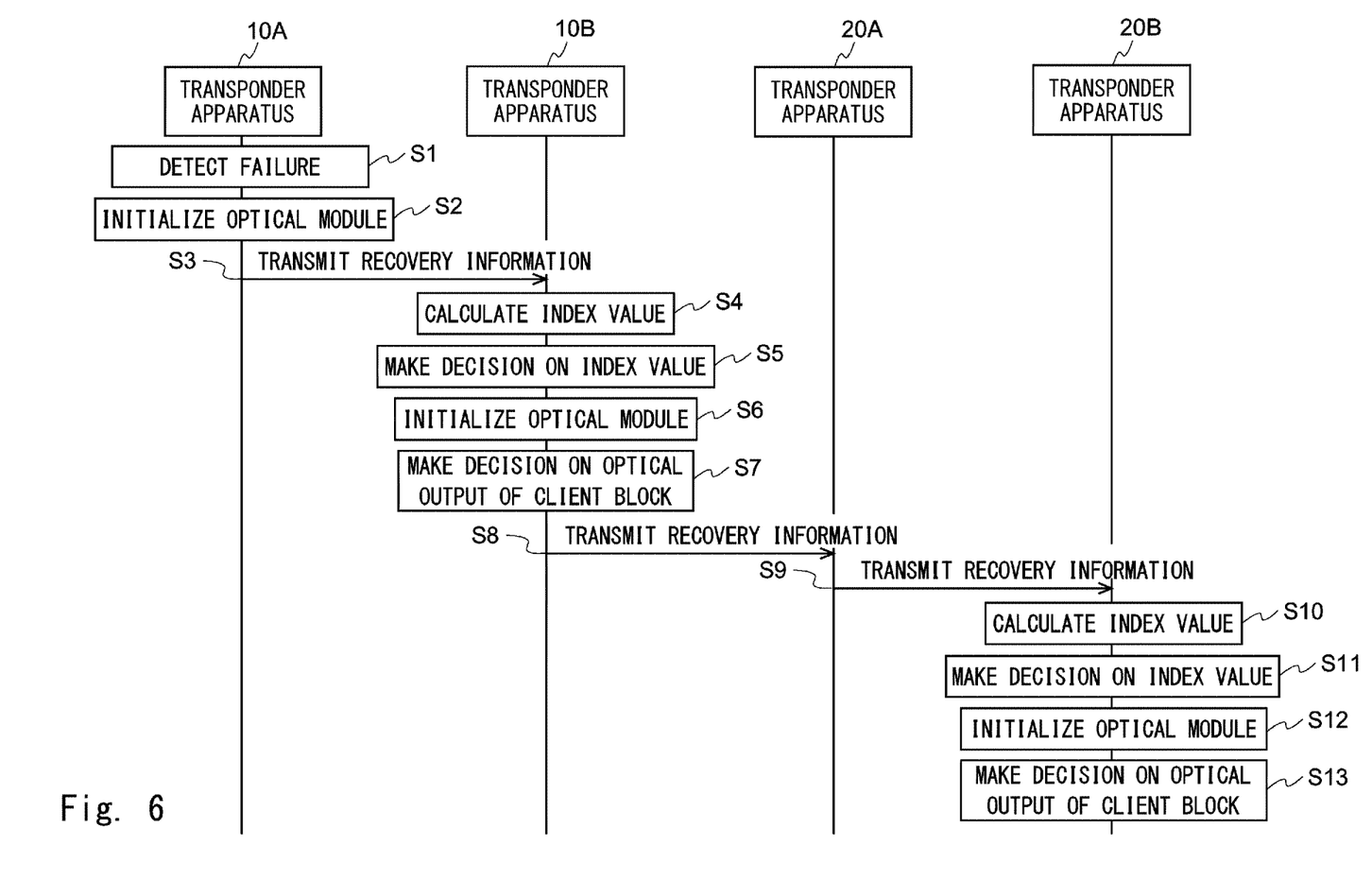
FIG. 6 is a sequence diagram showing an example of processes performed by a communication system according to an example embodiment.

FIG. 6 is a sequence diagram showing an example of processes performed by the communication system 1 according to an example embodiment. An example case where a failure of an input signal occurs in the transponder apparatus 10A will be described hereinafter.

In a step S1, the failure detection module 101 of the transponder apparatus 10A detects a failure of an input signal to the transponder apparatus 10A. In a step S2, the optical module control module 102 of the transponder apparatus 10A makes the optical module 15A provided in the transponder apparatus 10A perform a reset process. In a step S3, the transmitting module 103 of the transponder apparatus 10A transmits restoration information indicating that the transponder apparatus 10A has been restored from the failure to the transponder apparatus 10B.

Upon receiving the restoration information from the transponder apparatus 10A, the index-value calculation module 113 of the transponder apparatus 10B calculates, in a step S4, an index value indicating the quality of the transmission signal that the transponder apparatus 10B has received from the transponder apparatus 10A. For example, the index-value calculation module 113 can calculate the index value by using the bit error rate of the transmission signal indicating the restoration information based on the below-shown Expression 1.

$$Q=\text{sqrt}(2)\text{erfc}^{-1}(2\text{BER}) \quad \text{[Expression 1]}$$

In the expression, Q is an index value. Further, sqrt 2 represents the square root of 2. Further, erfc represents a complementary error function. Further, BER is the bit error rate of the transmission line.

In a step S5, the index-value determination module 114 of the transponder apparatus 10B determines whether or not the index value calculated by the index-value calculation module 113 of the transponder apparatus 10B is within a predetermined range. When the calculated index value is outside the predetermined range, the optical module control module 112 of the transponder apparatus 10B makes the optical module 15B of the transponder apparatus 10B perform a reset process in a step S6. Note that when the calculated index value is within the predetermined range, the optical module control module 112 does not make the optical module 15B of the transponder apparatus 10B perform the reset process. In this example embodiment, the transponder apparatus 10B repeatedly performs the processes in the steps S4 to S6 until the calculated index value goes out of the predetermined range.

In a step S7, the optical output determination module 115 of the transponder apparatus 10B determines the state of the optical output of the client block of the transponder apparatus 10B. When the state of the optical output of the client block is an ON-state, the transponder apparatus 10B transmits restoration information to the transponder apparatus 20A in a step S8.

Upon receiving the restoration information from the transponder apparatus 10B, the transponder apparatus 20A transfers the received restoration information to the transponder apparatus 20B in a step S9.

Upon receiving the restoration information from the transponder apparatus 20A, the index-value calculation module 113 of the transponder apparatus 20B calculates, in a step S10, an index value indicating the quality of the transmission signal that the transponder apparatus 20B has received from the transponder apparatus 20A.

In a step S11, the index-value determination module 114 of the transponder apparatus 20B determines whether or not the index value calculated by the index-value calculation module 113 of the transponder apparatus 20B is within a predetermined range. When the calculated index value is outside the predetermined range, the optical module control module 112 of the transponder apparatus 20B makes the optical module 15B of the transponder apparatus 20B perform a reset process in a step S12. Note that when the calculated index value is within the predetermined range, the optical module control module 112 does not make the optical module 15B of the transponder apparatus 20B perform the reset process. In this example embodiment, the transponder apparatus 20B repeatedly performs the processes in the steps S10 to S12 until the index value goes out of the predetermined range.

In a step S13, the optical output determination module 115 of the transponder apparatus 20B determines the state of the optical output of the client block of the transponder apparatus 20B. When the state of the optical output of the client block is an OFF-state, the series of processes shown in FIG. 6 ends. Note that when the state of the optical output of the client block is an ON-state, the transponder apparatus 20B transmits restoration information to the transponder apparatus disposed adjacent to and downstream of the transponder apparatus 20B.

Figure 7:
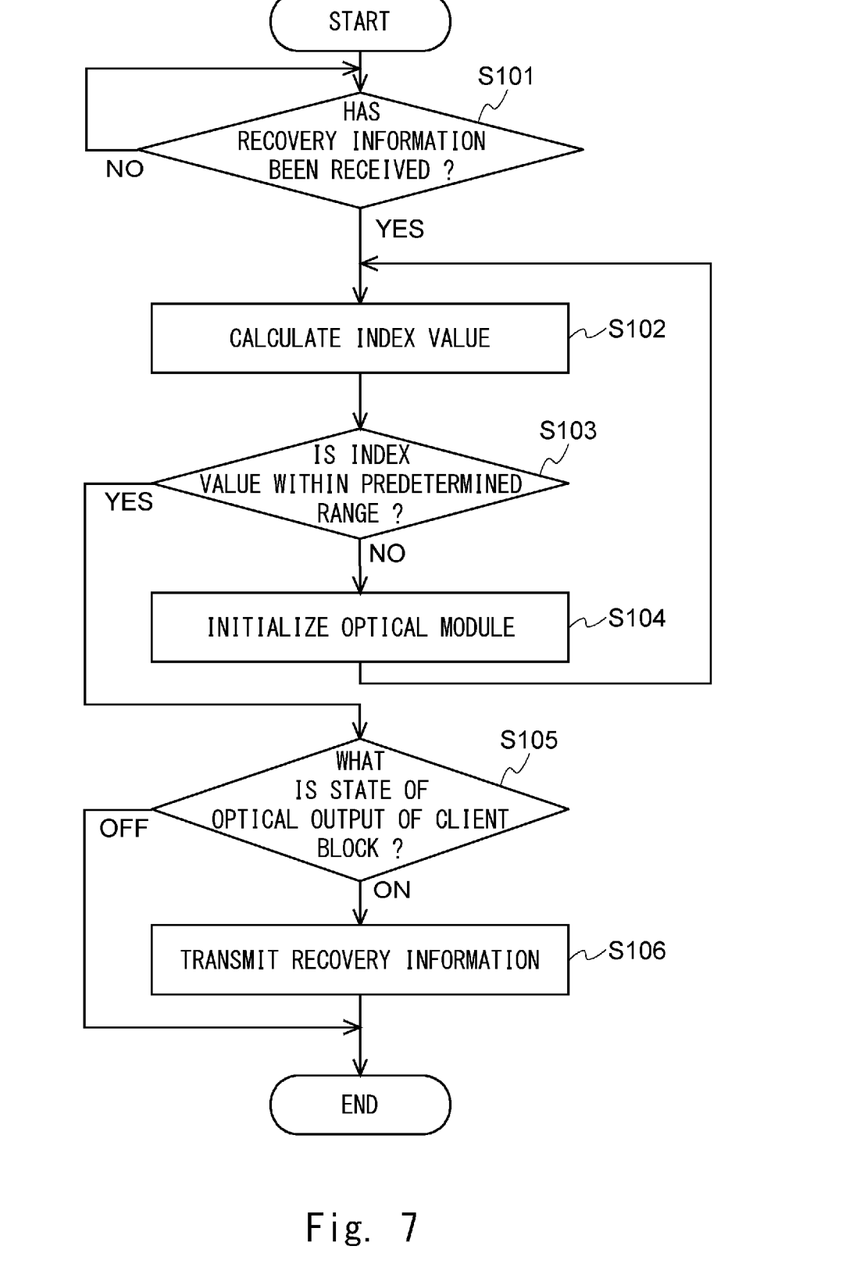
FIG. 7 is a flowchart showing an example of processes performed by a second transponder apparatus according to an example embodiment.

FIG. 7 is a flowchart showing an example of processes performed by a transponder apparatus such as the transponder apparatus 10B or 20B according to an example embodiment. The following description will be given by using the transponder apparatus 10B as an example.

In a step S101, the reception determination module 111 of the transponder apparatus 10B determines whether or not restoration information has been received. When it is determined that restoration information has not been received (NO), the process in the step S101 is performed again. On the other hand, when it is determined that restoration information has been received (YES), the index-value calculation module 113 calculates, in a step S102, an index value indicating the quality of the transmission signal received by the transponder apparatus 10B.

In a step S103, the index-value determination module 114 determines whether or not the calculated index value is within a predetermined range. When it is determined that the calculated index value is outside the predetermined range (NO), the optical module control module 112 initializes the optical module 15B in a step S104, and the process returns to the step S102.

On the other hand, when it is determined that the calculated index value is within the predetermined range (YES), the process branches to a step S105. In the step S105, the optical output determination module 115 determines the state of the optical output of the client block of the transponder apparatus 10B. When it is determined that the optical output of the client block is an OFF-state, the series of processes shown in FIG. 7 ends. On the other hand, when it is determined that the optical output of the client block is an ON-state, the transmitting module 116 transmits, in a step S106, restoration information to the transponder apparatus 20A disposed adjacent to and downstream of the transponder apparatus 10B, and the series of processes shown in FIG. 7 ends.

Figure 8:
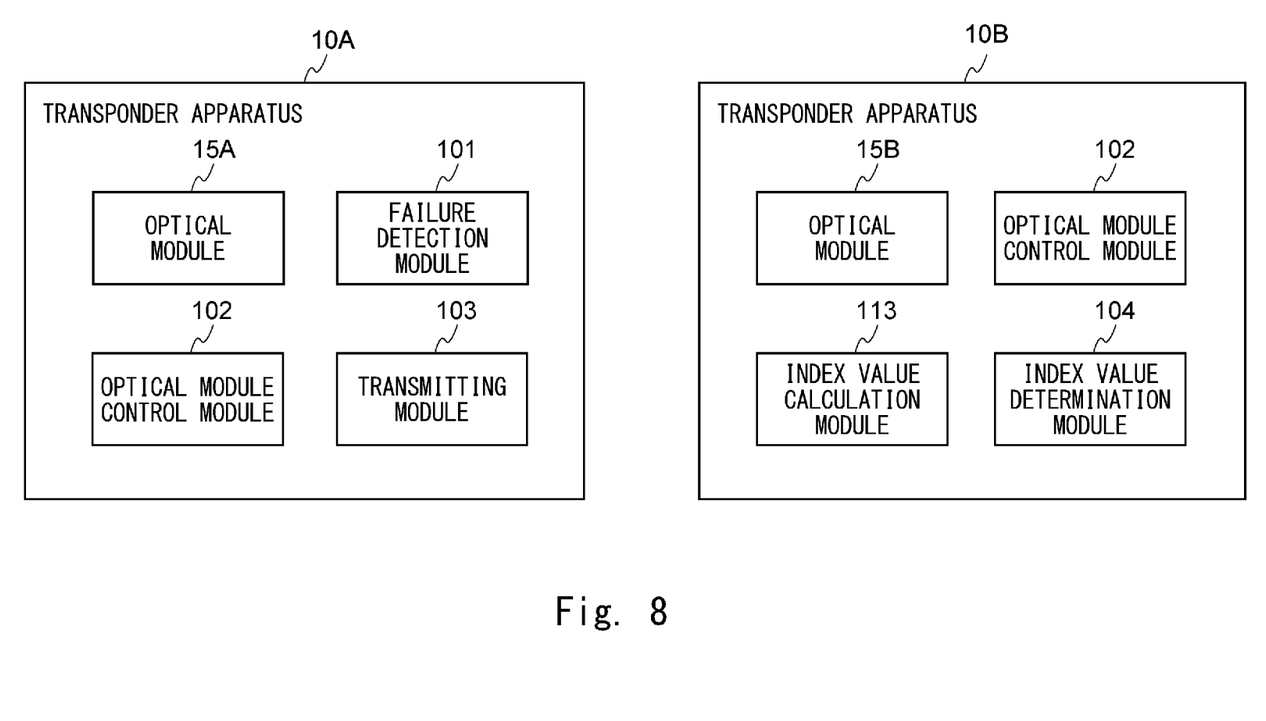
FIG. 8 shows main components of first and second transponder apparatuses according to an example embodiment.

FIG. 8 shows main components of the transponder apparatuses 10A and 10B according to an example embodiment. The transponder apparatus 10A includes an optical module 15A, a failure detection module 101, an optical module control module 102, and a transmitting module 103. The transponder apparatus 10B includes an optical module 15B, an optical module control module 112, an index-value calculation module 113, and an index-value determination module 114.

The optical module 15B processes a transmission signal received from a transponder apparatus disposed adjacent to and upstream of the own apparatus. The index-value calculation module 113 performs an index-value calculation process for calculating an index value indicating the quality of a transmission signal received from the transponder apparatus disposed adjacent to and upstream of the own apparatus. When the transponder apparatus disposed upstream of the own apparatus has received restoration information indicating that the transponder apparatus has been restored from the failure of the input signal to the transponder apparatus, the index-value determination module 114 performs an index-value determination process for determining whether or not the calculated index value is within a predetermined range. When it is determined that the calculated index value is not within the predetermined range, the optical module control module 112 makes the optical module 15B perform a reset process for receiving a new transmission signal from the transponder apparatus disposed adjacent to and upstream of the transponder apparatus 10B.

By adopting the above-described configuration, the transponder apparatus 10B can receive and process a new transmission signal when the transponder apparatus disposed upstream of the transponder apparatus 10B has been restored from a failure of an input signal, and the quality of a transmission signal already received by the transponder apparatus 10B does not meet (i.e., is lower than) a certain quality. Therefore, it is possible to prevent an adverse effect that is caused by a failure of a transmission signal input to the transponder apparatus 10B.

Further, for each of optical communication cables connected to corresponding transponder apparatuses, the predetermined range is individually determined based on the environmental conditions of that optical communication cable. Therefore, the transponder apparatus can evaluate the quality of a transmission signal received by the apparatus itself according to the installation conditions of the individual optical communication cable and the environmental conditions.

Further, the transponder apparatus 10B further includes the transmitting module 116 that transmits, when the transponder apparatus 10B has received restoration information, the received restoration information to the other transponder apparatus disposed adjacent to and downstream of the own apparatus. Therefore, the other transponder apparatus, which has received the restoration information, can perform the above-described index-value calculation process, the index-value determination process, and the reset process. Consequently, it is possible to prevent, not only the adverse effect that is caused by a failure of a transmission signal input to the transponder apparatus 10B, but also an adverse effect that is caused by a failure of a transmission signal input to the transponder apparatus disposed downstream of the transponder apparatus 10B. Accordingly, it is possible to prevent an adverse effect caused by a failure of a transmission signal input to any of the transponder apparatuses in communication system in which a plurality of transponder apparatus are connected in series.

Further, the reset process includes a process for discarding a transmission signal already received by the optical module 15A or 15B. As a result, a transmission signal that does not meet a certain quality, such as a weak transmission signal or a transmission signal corresponding to a noise or the like, is discarded, so that it is possible to prevent an adverse effect caused by a failure of a transmission signal input to any of the transponder apparatus 10B, 20A and 20B.

Further, the transponder apparatus 10B repeatedly performs the index-value calculation process, the index-value determination process, and the reset process until the index value falls within the predetermined range. As a result, the transponder apparatus 10B can receive a transmission signal that satisfies certain quality, thus making it possible to prevent an adverse effect caused by a failure of a transmission signal input to the transponder apparatus 10B.

In the above-described examples, the program 110 includes a set of instructions (or software codes) that, when being loaded into a computer, causes the computer to perform one or more of the functions described in the example embodiments. The program 110 may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

From the disclosure thus described, it will be obvious that the example embodiments of the disclosure may be varied in many ways. Such variations are not to be regarded as a departure from the spirit and scope of the disclosure, and all such modifications as would be obvious to one skilled in the art are intended for inclusion within the scope of the following claims.

For example, in another example embodiment, as the index value, a difference between a first index value indicating the quality of a transmission signal received by the apparatus itself, calculated based on the bit error rate of the transmission signal and a second index value indicating the quality of a transmission signal received by one of transponder apparatuses disposed upstream of the apparatus itself, calculated based on the bit error rate of the transmission signal may be used. The transponder apparatus disposed upstream of the apparatus itself includes a transponder apparatus disposed adjacent to and upstream of the apparatus itself and a transponder apparatus disposed adjacent to and upstream of the aforementioned transponder apparatus disposed adjacent to the apparatus itself. For example, when the apparatus itself is the transponder apparatus 20B, the transponder apparatus disposed upstream of the transponder apparatus 20B includes the transponder apparatuses 10A and 10B as well as the transponder apparatus 20A. One of these transponder apparatuses disposed upstream of the apparatus itself transmits the second index value to the transponder apparatus disposed downstream of the aforementioned transponder apparatus that should calculate the first index value. Then, when the transponder apparatus that should calculate the index value receives the second index value, the index-value calculation module 113 calculates the difference between the first and second index values, and the index-value determination module 114 determines whether or not the difference between the calculated index values is within a predetermined range.

Further, in another example embodiment, the transponder apparatus 10A or 20A, which is one of paired transponder apparatuses that is disposed upstream of the other apparatus, can execute the above-described program 110. In this example embodiment, the transponder apparatus 10A or 20A not only transfers restoration information but also performs processed described below. The following description will be given by using the transponder apparatus 10A as an example.

In this example embodiment, the arithmetic apparatus 14A of the transponder apparatus 10A calculates an index value indicating the quality of a transmission signal received from the transponder apparatus disposed adjacent to and upstream of the transponder apparatus 10A. Further, when the arithmetic apparatus 14A receives restoration information indicating that the transponder apparatus disposed upstream of the transponder apparatus 10A has been restored from a failure of an input signal, it determines whether or not the calculated index value is within a predetermined range. When it is determined that the calculated index value is not within the predetermined range, the arithmetic apparatus 14A makes the optical module 15A perform a reset process. As a result, the optical module 15A can receive a new transmission signal and transmit a new transmission signal that meets certain quality to the transponder apparatus 10B.

The whole or part of the example embodiments disclosed above can be described as, but not limited to, the following supplementary notes.

(Supplementary Note 1)

A communication system in which a plurality of communication apparatuses are connected in series through optical communication cables, comprising:

a first communication apparatus; and at least one second communication apparatus disposed downstream of the first communication apparatus, wherein the first communication apparatus comprises:

a first optical module configured to process a transmission signal received from a first upstream-side communication apparatus, the first upstream-side communication apparatus being another communication apparatus disposed adjacent to and upstream of the first communication apparatus; and a first processor, wherein the first processor is configured to:

detect a failure of an input signal to the first communication apparatus;

make, when the failure of the input signal is detected, the first optical module execute a reset process for receiving a new input signal; and transmit, when the first communication apparatus has been restored from the failure of the input signal by an execution of the reset process by the first optical module, restoration information indicating that the first communication apparatus has been restored from the failure to the second communication apparatus, wherein the second communication apparatus comprises:

a second optical module configured to process a transmission signal received from a second upstream-side communication apparatus, the second upstream-side communication apparatus being another communication apparatus disposed adjacent to and upstream of the second communication apparatus; and a second processor, and wherein the second processor is configured to:

calculate an index value indicating quality of a transmission signal received from the second upstream-side communication apparatus;

determine, when restoration information is received, whether or not the calculated index value is within a predetermined range; and make, when it is determined that the index value is not within a predetermined range, the second optical module execute a reset process for receiving a new transmission signal.

(Supplementary Note 2)

The communication system described in Supplementary note 1, wherein the second processor is configured to:

determine whether or not a first index value indicating quality of a transmission signal received by the second communication apparatus including the second processor is within the predetermined range, or determine whether or not a difference between the first index value and a second index value indicating quality of a transmission signal received by one of second upstream-side communication apparatuses is within the predetermined range.

(Supplementary Note 3)

The communication system described in Supplementary note 1, wherein the predetermined range is a range that is individually defined according to a corresponding environmental condition of the optical communication cable connected to the corresponding second communication apparatus including the second processor configured to determine the index value.

(Supplementary Note 4)

The communication system described in Supplementary note 3, wherein the predetermined range is a range of which upper and lower limits are set to maximum and minimum index values of a transmission signal that is received through the optical communication cable actually disposed in an installation environment when no failure has occurred in the transmission signal.

(Supplementary Note 5)

The communication system described in Supplementary note 1, wherein the communication system comprises a plurality of second communication apparatuses, and the second processor is further configured to, upon receiving the restoration information, transmit the restoration information to another second communication apparatus disposed adjacent to and downstream of the second communication apparatus including the second processor.

(Supplementary Note 6)

The communication system described in Supplementary note 1, wherein the reset process includes a process for discarding a transmission signal already received by the optical module.

(Supplementary Note 7)

A communication apparatus connected to other communication apparatuses in series through optical communication cables, comprising:

an optical module configured to process a transmission signal received from a upstream-side communication apparatus, the upstream-side communication apparatus being another communication apparatus disposed adjacent to and upstream of the own communication apparatus; and a processor, and wherein the processor is configured to:

calculate an index value indicating quality of a transmission signal received from the upstream-side communication apparatus;

determine, when restoration information is received, whether or not the calculated index value is within a predetermined range; and make, when it is determined that the index value is not within a predetermined range, the optical module execute a reset process for receiving a new transmission signal.

(Supplementary Note 8)

The communication apparatus described in Supplementary note 7, wherein the processor is configured to:

determine whether or not a first index value indicating quality of a transmission signal received by the own communication apparatus is within the predetermined range, or determine whether or not a difference between the first index value and a second index value indicating quality of a transmission signal received by one of second upstream-side communication apparatuses is within the predetermined range.

(Supplementary Note 9)

A method performed by a processor provided in a communication apparatus connected to another communication apparatus in series through an optical communication cable, comprising:

calculating an index value indicating quality of a transmission signal received from an upstream-side communication apparatus, the upstream-side communication apparatus being another communication apparatus disposed adjacent to and upstream of the communication apparatus including the processor;

determining, when restoration information indicating that the upstream-side communication apparatus has been restored from a failure of an input signal, whether or not the calculated index value is within a predetermined range; and making, when it is determined that the calculated index value is not within the predetermined range, an optical module execute a reset process for receiving a new transmission signal, the optical module being provided in the communication apparatus including the processor and configured to process a transmission signal.

(Supplementary Note 10)

The method described in Supplementary note 9, wherein the processor is configured to:

determine whether or not a first index value indicating quality of a transmission signal received by the communication apparatus including the processor is within the predetermined range, or determine whether or not a difference between the first index value and a second index value indicating quality of a transmission signal received by one of upstream-side communication apparatuses is within the predetermined range.

(Supplementary Note 11)

The method described in Supplementary note 9, wherein the predetermined range is a range that is individually defined according to a corresponding environmental condition of the optical communication cable connected to the corresponding communication apparatus including the processor configured to determine the index value.

(Supplementary Note 12)

The method described in Supplementary note 11, wherein the predetermined range is a range of which upper and lower limits are set to maximum and minimum index values of a transmission signal that is received through the optical communication cable actually disposed in an installation environment when no failure has occurred in the transmission signal.

(Supplementary Note 13)

The method described in Supplementary note 9, wherein the processor is further configured to, upon receiving the restoration information, transmit the restoration information to another communication apparatus disposed adjacent to and downstream of the communication apparatus including the processor.

(Supplementary Note 14)

The method described in Supplementary note 9, wherein the reset process includes a process for discarding a transmission signal already received by the optical module.

(Supplementary Note 15)

A non-transitory computer readable medium storing a program adapted to be executed by a processor provided in a communication apparatus connected to another communication apparatus through an optical communication cable, the program being configured to cause the processor to perform:

a step of calculating an index value indicating quality of a transmission signal received from an upstream-side communication apparatus, the upstream-side communication apparatus being another communication apparatus disposed adjacent to and upstream of the communication apparatus including the processor;

a step of determining, when restoration information indicating that the upstream-side communication apparatus has been restored from a failure of an input signal, whether or not the calculated index value is within a predetermined range; and a step of making, when it is determined that the calculated index value is not within the predetermined range, an optical module execute a reset process for receiving a new transmission signal, the optical module being provided in the communication apparatus including the processor and configured to process a transmission signal.

What is claimed is:

1. A communication system in which a plurality of communication apparatuses are connected in series through optical communication cables, comprising:

a first communication apparatus; and at least one second communication apparatus disposed downstream of the first communication apparatus, wherein the first communication apparatus comprises:

a first optical module configured to process a transmission signal received from a first upstream-side communication apparatus, the first upstream-side communication apparatus being another communication apparatus disposed adjacent to and upstream of the first communication apparatus; and a first processor, wherein the first processor is configured to:

detect a failure of an input signal to the first communication apparatus;

make, when the failure of the input signal is detected, the first optical module execute a reset process for receiving a new input signal; and transmit, when the first communication apparatus has been restored from the failure of the input signal by an execution of the reset process by the first optical module, restoration information indicating that the first communication apparatus has been restored from the failure to the second communication apparatus, wherein the second communication apparatus comprises:

a second optical module configured to process a transmission signal received from a second upstream-side communication apparatus, the second upstream-side communication apparatus being another communication apparatus disposed adjacent to and upstream of the second communication apparatus; and a second processor, and wherein the second processor is configured to:

calculate an index value indicating quality of a transmission signal received from the second upstream-side communication apparatus;

determine, when restoration information is received, whether or not the calculated index value is within a predetermined range; and make, when it is determined that the index value is not within a predetermined range, the second optical module execute a reset process for receiving a new transmission signal.

2. The communication system according to claim 1, wherein the second processor is configured to:

determine whether or not a first index value indicating quality of a transmission signal received by the second communication apparatus including the second processor is within the predetermined range, or determine whether or not a difference between the first index value and a second index value indicating quality of a transmission signal received by one of second upstream-side communication apparatuses is within the predetermined range.

3. The communication system according to claim 1, wherein the predetermined range is a range that is individually defined according to a corresponding environmental condition of the optical communication cable connected to the corresponding second communication apparatus including the second processor configured to determine the index value.

4. The communication system according to claim 3, wherein the predetermined range is a range of which upper and lower limits are set to maximum and minimum index values of a transmission signal that is received through the optical communication cable actually disposed in an installation environment when no failure has occurred in the transmission signal.

5. The communication system according to claim 1, wherein the communication system comprises a plurality of second communication apparatuses, and the second processor is further configured to, upon receiving the restoration information, transmit the restoration information to another second communication apparatus disposed adjacent to and downstream of the second communication apparatus including the second processor.

6. The communication system according to claim 1, wherein the reset process includes a process for discarding a transmission signal already received by the optical module.

7. A method performed by a processor provided in a communication apparatus connected to another communication apparatus in series through an optical communication cable, comprising:

calculating an index value indicating quality of a transmission signal received from an upstream-side communication apparatus, the upstream-side communication apparatus being another communication apparatus disposed adjacent to and upstream of the communication apparatus including the processor;

determining, when restoration information indicating that the upstream-side communication apparatus has been restored from a failure of an input signal, whether or not the calculated index value is within a predetermined range; and making, when it is determined that the calculated index value is not within the predetermined range, an optical module execute a reset process for receiving a new transmission signal, the optical module being provided in the communication apparatus including the processor and configured to process a transmission signal.

8. The method according to claim 7, wherein the processor is configured to:

determine whether or not a first index value indicating quality of a transmission signal received by the communication apparatus including the processor is within the predetermined range, or determine whether or not a difference between the first index value and a second index value indicating quality of a transmission signal received by one of upstream-side communication apparatuses is within the predetermined range.

9. The method according to claim 7, wherein the predetermined range is a range that is individually defined according to a corresponding environmental condition of the optical communication cable connected to the corresponding communication apparatus including the processor configured to determine the index value.

10. The method according to claim 9, wherein the predetermined range is a range of which upper and lower limits are set to maximum and minimum index values of a transmission signal that is received through the optical communication cable actually disposed in an installation environment when no failure has occurred in the transmission signal.

11. The method according to claim 7, wherein the processor is further configured to, upon receiving the restoration information, transmit the restoration information to another communication apparatus disposed adjacent to and downstream of the communication apparatus including the processor.

12. The method according to claim 7, wherein the reset process includes a process for discarding a transmission signal already received by the optical module.

13. A non-transitory computer readable medium storing a program adapted to be executed by a processor provided in a communication apparatus connected to another communication apparatus through an optical communication cable, the program being configured to cause the processor to perform:

a step of calculating an index value indicating quality of a transmission signal received from an upstream-side communication apparatus, the upstream-side communication apparatus being another communication apparatus disposed adjacent to and upstream of the communication apparatus including the processor;

a step of determining, when restoration information indicating that the upstream-side communication apparatus has been restored from a failure of an input signal, whether or not the calculated index value is within a predetermined range; and a step of making, when it is determined that the calculated index value is not within the predetermined range, an optical module execute a reset process for receiving a new transmission signal, the optical module being provided in the communication apparatus including the processor and configured to process a transmission signal.

\* \* \* \* \*